United States Patent [19]

Fukuda et al.

[11] 4,443,588
[45] Apr. 17, 1984

[54] HIGHLY REFRACTIVE URETHANE POLYMERS FOR USE IN OPTICAL LENSES AND LENSES PREPARED THEREFROM

[75] Inventors: Tadanori Fukuda, Ohtsu; Tadayo Matsunaga, Hirakata, both of Japan

[73] Assignee: Toray Industries, Inc., Tokyo, Japan

[21] Appl. No.: 349,647

[22] Filed: Feb. 17, 1982

[30] Foreign Application Priority Data

Feb. 19, 1981 [JP] Japan .................................. 56-22194
Feb. 19, 1981 [JP] Japan .................................. 56-22195

[51] Int. Cl.³ ............................................. C08F 26/02
[52] U.S. Cl. ....................................... 526/301; 528/75
[58] Field of Search ........................... 526/301; 528/75

[56] References Cited

U.S. PATENT DOCUMENTS 3,553,174 1/1971 Hausslein et al. ...................... 528/52
3,907,865 9/1975 Miyata et al. ........................ 526/301

Primary Examiner—Joseph L. Schofer
Assistant Examiner—Bernard Lipman
Attorney, Agent, or Firm—Austin R. Miller

[57] ABSTRACT

Highly refractive urethane polymers for use in optical lenses and the lenses produced therefrom are obtained by polymerizing at least one unsaturated urethane compound which is the reaction product of at least one xylylene diisocyanate and at least one compound selected from the group comprising:

1.

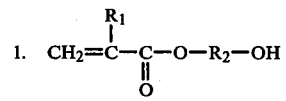

where:
$R_1$ is either H or $CH_3$
$R_2$ is a remnant radical of a substituent or non-substituent hydrocarbon having 2–4 carbon atoms;

2.

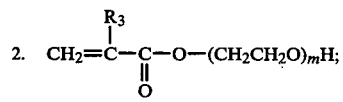

where:
$R_3$ is either H or $CH_3$
$m = 2-5$;

$CH_2=CH-CH_2-OH$; and     3

$(CH_2=CH-CH_2-O-CH_2)_2 CHOH$.     4

7 Claims, No Drawings

HIGHLY REFRACTIVE URETHANE POLYMERS FOR USE IN OPTICAL LENSES AND LENSES PREPARED THEREFROM

BACKGROUND OF THE INVENTION

1. Field of the Invention

The present invention relates to organic glass polymers for use in optical lenses and the lenses prepared therefrom. More particularly, the present invention relates to the excellent polymers for use in optical lenses having a high refractive index and the lenses prepared therefrom.

2. Description of the Prior Art

In recent years plastic lenses have come into wide use and in many cases have replaced inorganic glass lenses.

Plastic lenses have many advantages which inorganic glass lenses do not, namely low weight, impact and shatter resistance, easier processability and good dyeability, among others. In these days, polymethylmethacrylate, polydiethyleneglycol bisallylcarbonate, polycarbonate, polystyrene and the like have been widely used in various fields.

Especially in the field of ophthalmic lenses, low weight, high impact resistance and stiffness are strongly desired. Unfortunately, polydiethyleneglycol bisallycarbonate, the predominantly used material in making plastic ophthalmic lenses, has a relatively low refractive index ($\eta_D$) of 1.50. This means that the lenses composed of polydiethyleneglycol bisallycarbonate are significantly thicker than comparable inorganic glass lenses.

While polycarbonate and polystyrene have relatively high refractive indices they are unsuitable for ophthalmic lenses because of their low heat resistance, poor solvent resistance and low Abbe number.

Thus, there has been a strong need for a plastic material having good optical properties including a high refractive index and a high Abbe number for use in ophthalmic lenses.

It has now been found that an organic glass having a high refractive index, excellent heat and impact resistance, and other desirable properties for lenses can be obtained by polymerizing a specific unsaturated urethane compound as a main component.

OBJECTS OF THE INVENTION

An important object of the present invention is to provide polymers having a high refractive index for use in optical lenses and lenses obtained therefrom.

Another important object of this invention is to provide polymers for use in optical lenses having excellent impact and heat resistance and lenses made thereof.

Stil another important object of this invention is to provide polymers for use in optical lenses having excellent clarity and high resistance to coloring and the lenses made thereof.

SUMMARY OF THE INVENTION

Highly refractive polymers for use in optical lenses are obtained by polymerizing at least one unsaturated urethane compound, which is the reaction product of:

(I) at least one xylylene diisocyanate, having the formula:

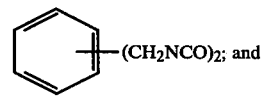

(II) at least one compound selected from the group comprising:

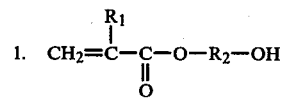

where:
$R_1$ is either H or $CH_3$
$R_2$ is a remnant radical of a substituent or non-substituent hydrocarbon having 2-4 carbon atoms;

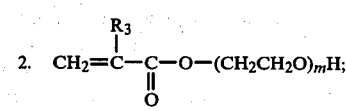

where:
$R_3$ is either H or $CH_3$
m=2-5;

$$CH_2=CH-CH_2-OH; \quad (3)$$

and $$(CH_2=CH-CH_2-O-CH_2)_2CHOH. \quad (4)$$

DESCRIPTION OF THE PREFERRED EMBODIMENTS

Xylylene diisocyanate may contain various isomers such as ortho-, meta- and para-types. The unsaturated urethane compounds are obtained easily by the addition reaction of xylylene diisocyanate having an NCO group, with the formula II compounds, having OH groups. This addition reaction is preferably carried out at a temperature of about 20° to about 80° C. for a period of about 1 to about 5 hours. However, care must be taken to prevent the polymerization of the formula II compounds during this addition reaction.

While as the isocyanate component, the modified prepolymer adducts obtained by adding xylylene diisocyanate to trimethylol propane, ethylene glycol, etc. can also be used to achieve the highly refractive urethane polymers and lenses of the present invention. The amount of xylylene diisocyanate in the unsaturated urethane compound is preferably in the range from about 30 to about 80 percent by weight. In particular, a range from about 40 to about 60 percent by weight is most preferable in order to achieve the highly desirable optical properties mentioned above.

Further, the NCO/OH mole ratio in the mixture comprising xylylene diisocyanate and the formula II compound should be within the range from about 1.0 to about 2.0.

Furthermore, the highly refractive polymers and lenses of the present invention can also be obtained by the polymerization and/or the poly-addition reaction between the above-mentioned unsaturated urethane compounds with a radically polymerizable second monomer and/or a third compound having two or more hydroxyl groups per molecule.

As mentioned above, the first component of the unsaturated urethane compound is used as the main component and is advantageously used in an amount of more than about 40 percent by weight, preferably more than about 60 percent by weight. When the first component is used in an amount less than about 40 percent by weight, the polymer properties such as impact resistance, stiffness, and refractive index are not exceptional. However, these properties are greatly improved by increasing the amount of said first component to 40% by weight or higher.

The optional second monomer component also improves the optical and physical properties of the copolymer and especially the processability on account of its lowering the viscosity of the mixture.

The second component is advantageously a monomer which may be radically copolymerized with the unsaturated urethane compound mentioned above. It is preferable that the second monomer component be substantially clear and colorless, have a high refractive index and be compatible with the first component.

Representative examples of the second monomer component are given below:

(1) styrene or its derivatives such as α-methyl styrene
(2) allyl compounds; for example, diallyl phthalate, triallyl trimellitate, etc.
(3) acrylic acid ester, methacrylic acid ester and esters containing a hydroxyl group, for example, acrylates and methacrylates of methyl, ethyl, 2-hydroxy-ethyl, 2-hydroxy-propyl, benzyl, phenyl, etc.

Among these monomers, the preferred second monomers are styrene, phenyl(meth)acrylate, benzyl(meth)acrylate, diallyl phthalate, triallyl trimellitate, etc. These may be used either singly or as a mixture of two or more.

A third optional component used in the urethane polymers and lenses of the present invention is a compound having two or more hydroxyl groups per molecule, namely diols, triols, etc.

Such a compound is preferably a clear liquid having a low viscosity. Hereupon are given a few representative examples of the third component:

Diols ethylene glycol, propylene glycol and cyclohexane dimethanol.

Triols glycerol, trimethylol propane and 1,2,6-hexane triol.

Among these examples, the most preferable are glycerol, ethylene glycol and cyclohexane dimethanol.

These may be used either singly or as a mixture of two or more. The third component is useful for obtaining lenses having improved properties such as impact and solvent resistance, etc.

The hydroxyl group of the third component reacts with the NCO group of the aforesaid first component. Accordingly, the amount of the third component varies with the content of the unreacted residual NCO of the unsaturated urethane compound incorporated as the first component. The NCO/OH mole ratio of the total composition should be adjusted to about 1.0.

The characteristics of the urethane polymers and lenses of this invention are as follows:

(1) A high (above 1.50) refractive index;
(2) Excellent impact resistance, stiffness and hardness (These properties are very important in thin optical lens applications); and
(3) Excellent weatherability.

In order to initiate the polymerization reactions used to produce the polymers and lenses of the present invention, a conventional polymerization initiator such as diisopropylperoxydicarbonate, azobisisobutyronitrile, di-tert-butylperoxide, for examples, can be used.

To prepare the polymers and lenses of the present invention, one or more of the unsaturated urethane compounds, optionally together with the second and third components, and the polymerization initiator are mixed to prepare a casting syrup which is poured into a casting mold assembled with molds and gaskets and then cured by means of heat, or U.V. radiation, for examples.

Generally in heat curing, a temperature range from about 50° to about 150° C. is preferred.

It is also possible to react xylylene diisocyanate with the above-mentioned hydroxyl monomers of the general formula II in the casting mold and then cure directly by using an initiator.

The polymers and lenses of the present invention, in addition to uses such as ophthalmic lenses, can also be used in camera lenses as well as other optical elements.

The following examples are illustrative of this invention:

EXAMPLE 1

The following monomer (A) was charged into a vessel equipped with a stirrer, a thermometer, a reflux condenser and a nitrogen gas inlet tube. The isocyanate (B) was then added to the vessel with stirring under a nitrogen atmosphere and the mixture was maintained at 50° C. for 1 hour until the NCO groups had completely reacted with the OH groups. The initiator (C) was then added and stirred into the mixture.

| Monomer (A) | B-Hydroxyethyl acrylate | 45 g. |
| Isocyanate (B) | Xylylene diisocyanate | 55 g. |
| Initiator (C) | Di-tert-butyl peroxide | 0.1 g. |

NCO/OH = 100/100

This resulting mixture, maintained at a temperature of 50° C., was poured into a glass casting mold for making optical lenses. The mixture was maintained for 4 hours at 80° C., then for 16 hours at 100° C., further for 8 hours at 120° C. and was gradually cooled to room temperature.

The resulting copolymer lens was transparent and had a refractive index of 1.55. The lens had excellent heat resistance, impact resistance and stiffness, as shown in Table I.

EXAMPLE 2

The following monomers (A) and (B) were charged into a vessel equipped with a stirrer, a thermometer, a reflux condenser and a nitrogen gas inlet tube. The isocyanate (C) was then added under a nitrogen atmosphere and the mixture was maintained at 40° C. for 2 hours until the NCO groups had completely reacted with the OH groups. The initiator (D) was then added and the mixture stirred.

| Monomer | (A) | Allyl alcohol | 23 g. |
| Monomer | (B) | Benzylacrylate | 40 g. |

| | | -continued | |
|---|---|---|---|
| Isocyanate | (C) | Xylylene diisocyanate | 37 g. |
| Initiator | (D) | Di-tert-butylperoxide | 0.6 g. |

NCO/OH = 100/100

The resulting mixture was poured into a glass casting mold for making lenses and was held for 4 hours at 80° C., then for 16 hours at 100° C., and for 16 hours at 120° C. Afterwards, the lens was gradually cooled to room temperature.

The obtained polymer lens was clear and had a refractive index of 1.57. This polymer lens had excellent physical properties as shown in Table I.

EXAMPLE 3

The following monomers (A) and (B) were charged into a vessel equipped with a stirrer, a thermometer, a reflux condenser and a nitrogen gas inlet tube. The isocyanate (C) was then added under a nitrogen atmosphere and the mixture was maintained at 20°–40° C. for 3 to 7 hours until the OH groups had completely reacted with the NCO groups. In this example, the NCO-/OH ratio of this mixture was greater than 1.0. (hence some residual NCO from the isocyanate (C) remained in the mixture).

The initiator (D) was then added, and the hydroxyl compound (E) was added to the mixture which was stirred sufficiently keeping the temperature below 30° C.

| Monomer | (A) | B-Hydroxyethyl methacrylate | 30 g. |
|---|---|---|---|
| Monomer | (B) | Phenyl methacrylate | 26 g. |
| Isocyanate | (C) | Xylylene diisocyanate | 30 g. |
| Initiator | (D) | Di-tert-butylperoxide | 0.09 g. |
| Hydroxyl Compound | (E) | Cyclohexyl dimethanol | 14 g. |

NCO of (C)/OH of (A) + (E) = 100/(70 + 30)

The resulting mixture was poured into a glass casting mold for making lenses, and was held for 4 hours at 80° C., then for 16 hours at 100° C., and further for 8 hours at 120° C. Afterwards, it was gradually cooled to room temperature.

The obtained polymer was transparent and had a refractive index of 1.56. The lens had excellent heat resistance, impact resistance and stiffness, as shown in Table I.

EXAMPLES 4–7

Lenses having various compositions were prepared by the same method described in Examples 1, 2 and 3. The main properties of these lenses were evaluated by the methods described hereinafter. The results are shown in Table I and compared with lenses made from conventional materials such as polydiethyleneglycol bisallycarbonate (comparative example 1) and polymethylmethacrylate (comparative example 2).

As shown in Table I, the lenses obtained by the present invention are superior to conventional plastic lenses in refractive index, heat resistance, impact resistance and so on.

Refractive index $\eta_D$: Refractive index measured at wavelength 589.3 m$\mu$ by Abbe's refractometer.

Abbe number: Calculated from the following equation:

$$\text{Abbe number} = \frac{\eta_D - 1}{\eta_F - \eta_C}$$

D: 589.3 m$\mu$
F: 486.1 m$\mu$
C: 656.3 m$\mu$

| | |
|---|---|
| Impact resistance | FDA Standard test method, central thickness of lens is 2 mm |
| Heat resistance | Examined with eye directly on self-coloring and contortion after heating at 120° C. for 2 hours. |
| Pencil hardness | Measured according to JIS K-5400 |
| Solvent resistance | Examined with eye on appearance of lens after dipping in methanol at 20° C. for 1 day |

TABLE 1

| | | Properties of Lens | | | | | | |
|---|---|---|---|---|---|---|---|---|
| No. | Monomer Composition ( ) g | Refractive Index | Abbe Number | Hardness | Color | Impact Resistance | Heat Resistance | Solvent Resistance |
| Comparative Example 1 | Diethyleneglycol bisallylcarbonate (100) | 1.50 | 58 | 2H | Colorless | good | good | excellent |
| Comparative Example 2 | Methylmethacrylate (100) | 1.49 | 58 | H | Colorless | poor | poor | poor |
| Example 1 | Xylylene diisocyanate/ Hydroxyethyl acrylate (55/45) | 1.55 | 40 | 2H | Colorless | excellent | excellent | excellent |
| Example 2 | Xylylene diisocyanate/ Allylalcohol/ Benzylacrylate (37/23/40) | 1.57 | 35 | 2H | Colorless | good | excellent | excellent |
| Example 3 | Xylylenediisocyanate/ Hydroxyethylmethacrylate/ Phenylmethacrylate/ Cyclohexane dimethanol (30/30/26/14) | 1.56 | 38 | 2H | Colorless | excellent | excellent | excellent |
| Example 4 | Xylylene diisocyanate/ Hydroxyethylacrylate/ Styrene/Glycerol (32/28/37/3) | 1.57 | 36 | 2H | slightly yellow | good | excellent | excellent |
| Example 5 | Xylylene diisocyanate/Allylalcohol/ Phenoxyethylacrylate (37/23/40) | 1.58 | 34 | 2H | Colorless | good | excellent | excellent |
| Example 6 | Xylylene diisocya- | 1.56 | 37 | 3H | Colorless | excellent | good | excellent |

TABLE 1-continued

| | | Properties of Lens | | | | | | |
|---|---|---|---|---|---|---|---|---|
| No. | Monomer Composition ( ) g | Refractive Index | Abbe Number | Hardness | Color | Impact Resistance | Heat Resistance | Solvent Resistance |
| | nate/Tetraethyleneglycolmethacrylate/ Diallyl phthalate (13/37/50) | | | | | | | |
| Example 7 | Xylylene diisocyanate/Glyceroldiallylether/Triallyl trimellitate (21/39/40) | 1.56 | 36 | 3H | Slightly Brown | good | good | excellent |

We claim:

1. A lens having a refractive index $n_D^{20}$ of more than 1.55 comprising a highly refractive, highly uniformly refractive, hard, thermosetting polymerization product of at least one unsaturated urethane compound, said unsaturated urethane compound being a reaction product of at least one xylylene diisocyanate with at least one compound selected from the group consisting of:

(a) 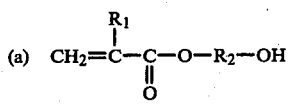

where:
R₁ is either H or CH₃; and
R₂ is a remnant radical of a substituent or non-substituent hydrocarbon having 2-4 carbon atoms;

(b) 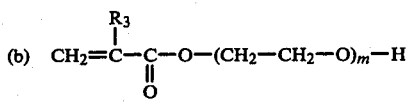

where:
R₃ is either H or CH₃; and
m = 2-5;

$CH_2=CH-CH_2-OH$; (c)

and $(CH_2=CH-CH_2-O-CH_2)_2-CHOH$ (d).

2. A lens as defined in claim 1, wherein said polymer is the co-polymerization product of a mixture comprising at least one of said unsaturated urethane compounds and at least one radically polymerizable monomer.

3. A lens as defined in claim 1, wherein said polymer is the polymerization and polyaddition product of a mixture comprising at least one of said unsaturated urethane compounds, and at least one compounds having at least two hydroxyl groups per molecule.

4. A lens as defined in claim 1, wherein said polymer is the copolymerization and poly-addition product of a mixture comprising at least one of said unsaturated urethane compounds, at least one radically polymerizable monomer and at least one compound having at least two hydroxyl groups per molecule.

5. The lens as described in claim 1, 2, 3 or 4, wherein said unsaturated urethane compound comprises at least 40% by weight of said mixture.

6. The lens as described in claim 2 or 3, wherein said radically polymerizable monomers are selected from the group consisting of styrene, phenyl(meth)acrylate, benzyl(meth)acrylate, diallyl phthalate, triallyl trimellitate, phenylacrylate, benzylacrylate, phenoxyethylmethacrylate, phenoxyethylacrylate and mixtures thereof.

7. A lens as defined in claim 3 or 4, wherein said compound having at least two hydroxyl groups per molecule is selected from the group consisting of glycerol, ethylene glycol and cyclohexane dimethanol.

* * * * *